US010623341B2

(12) United States Patent
Hathorn et al.

(10) Patent No.: US 10,623,341 B2
(45) Date of Patent: Apr. 14, 2020

(54) CONFIGURATION OF A SET OF QUEUES FOR MULTI-PROTOCOL OPERATIONS IN A TARGET DRIVER

(71) Applicant: INTERNATIONAL BUSINESS MACHINES CORPORATION, Armonk, NY (US)

(72) Inventors: Roger G. Hathorn, Tucson, AZ (US); Bret W. Holley, Tucson, AZ (US); Steven E. Klein, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 850 days.

(21) Appl. No.: 14/870,385

(22) Filed: Sep. 30, 2015

(65) Prior Publication Data

US 2017/0093760 A1    Mar. 30, 2017

(51) Int. Cl.
*H04L 12/931* (2013.01)
*H04L 12/935* (2013.01)
*H04L 12/879* (2013.01)

(52) U.S. Cl.
CPC .......... *H04L 49/60* (2013.01); *H04L 49/3018* (2013.01); *H04L 49/3027* (2013.01); *H04L 49/357* (2013.01); *H04L 49/901* (2013.01)

(58) Field of Classification Search
CPC ....... H04L 49/90; H04L 49/356; H04L 45/38; H04L 47/10; H04L 29/08846; H04L 12/66; H04L 49/9005; H04L 49/9047; H04L 49/3018; H04L 49/357; H04L 49/60; G06F 11/2089; G06F 13/385; G06F 13/126; G06F 9/5027; G06F 13/1673; G06F 2003/0691
See application file for complete search history.

(56) References Cited

U.S. PATENT DOCUMENTS 5,905,945 A * 5/1999 Hill ........................... H04L 1/08
                                                        340/7.22
6,065,087 A * 5/2000 Keaveny ............. G06F 13/4022
                                                        370/402

(Continued)

FOREIGN PATENT DOCUMENTS

| GB | 2363551 | 12/2001 |
| WO | 9835307 | 8/1998 |
| WO | 9957644 | 11/1999 |

OTHER PUBLICATIONS

Can-Hao, et al., "Design and Research on a Multi-Protocol RAID", Eighth International Symposium on Optical Storage and 2008 International Workshop on Information Data Storage, Proc. of SPIE vol. 7125, 7125S, 2009, [online] http://proceedings.spiedigitallibrary.org/ on Aug. 11, 2015.

(Continued)

*Primary Examiner* — Aaron N Strange
(74) *Attorney, Agent, or Firm* — Rabindranath Dutta; Konrad Raynes Davda & Victor LLP

(57) ABSTRACT

A plurality of queues including a target input queue is configured for multi-protocol operation in a driver. The target input queue is configured to receive all incoming new input/output (I/O) initiation messages, regardless of protocol, wherein messages on the target input queue include messages for first burst data that follows a command to preserve order in processing of messages, in response to allocation of identical exchange identifiers to reused messages.

20 Claims, 11 Drawing Sheets

(56) References Cited

U.S. PATENT DOCUMENTS

| | | | | |
|---|---|---|---|---|
| 6,230,218 | B1* | 5/2001 | Casper | G06F 13/126 709/237 |
| 6,314,477 | B1* | 11/2001 | Cowger | H04L 47/10 370/394 |
| 6,463,498 | B1* | 10/2002 | Wakeley | G06F 13/385 370/464 |
| 6,526,458 | B1* | 2/2003 | Steinmetz | G06F 13/385 709/217 |
| 6,578,096 | B1* | 6/2003 | Steinmetz | G06F 13/385 710/104 |
| 6,754,250 | B2* | 6/2004 | Haartsen | H04B 1/713 375/132 |
| 7,672,323 | B2* | 3/2010 | Sundaram | H04J 3/0682 370/232 |
| 7,840,719 | B2* | 11/2010 | Casper | G06F 13/126 710/35 |
| 7,917,539 | B1* | 3/2011 | Srinivasan | G06F 12/0866 707/802 |
| 8,340,120 | B2* | 12/2012 | Balakavi | H04L 49/602 370/463 |
| 8,451,711 | B1* | 5/2013 | O'Toole, Jr. | H04L 67/2814 370/216 |
| 8,782,161 | B2* | 7/2014 | Sugumar | G06F 9/5027 709/212 |
| 8,934,890 | B2* | 1/2015 | Hu | H04L 49/90 370/230 |
| 9,071,559 | B1* | 6/2015 | Dropps | H04L 49/90 |
| 9,094,333 | B1* | 7/2015 | Klemin | H04L 49/356 |
| 9,397,735 | B2* | 7/2016 | Nammi | H04B 7/0417 |
| 2003/0023709 | A1* | 1/2003 | Alvarez | G06F 8/65 709/223 |
| 2005/0060442 | A1* | 3/2005 | Beverly | H04L 47/10 710/33 |
| 2005/0060574 | A1* | 3/2005 | Klotz | H04L 41/22 726/4 |
| 2005/0076113 | A1* | 4/2005 | Klotz | H04L 41/12 709/224 |
| 2006/0161707 | A1* | 7/2006 | Davies | G06F 11/2089 710/268 |
| 2007/0089030 | A1* | 4/2007 | Beracoechea | H04L 49/90 714/762 |
| 2007/0094402 | A1* | 4/2007 | Stevenson | H04L 29/08846 709/229 |
| 2007/0266179 | A1* | 11/2007 | Chavan | G06F 13/4022 709/250 |
| 2008/0162811 | A1* | 7/2008 | Steinmetz | G06F 13/4234 711/114 |
| 2010/0056173 | A1* | 3/2010 | Bloom | H04W 4/02 455/456.1 |
| 2013/0007181 | A1* | 1/2013 | Sugumar | G06F 9/5027 709/212 |
| 2014/0044028 | A1* | 2/2014 | Nammi | H04B 7/0417 370/311 |
| 2016/0248628 | A1* | 8/2016 | Pandit | H04L 41/0806 |
| 2018/0248813 | A1* | 8/2018 | Zheng | G06F 12/0875 |

OTHER PUBLICATIONS

U.S. Appl. No. 14/870,393, filed Sep. 30, 2015, by inventors C.S. Cardinell, R.G. Hathorn, S.E. Klein and B. Laubli.

U.S. Appl. No. 14/870,410, filed Sep. 30, 2015, by inventors C.S. Cardinell, R.G. Hathorn, S.E. Klein and B. Laubli.

U.S. Appl. No. 14/870,422, filed Sep. 30, 2015, by inventors M.P. Bendyk, C.S. Cardinell, R.G. Hathorn, and S.E. Klein.

U.S. Appl. No. 14/870,549, filed Sep. 30, 2015, by inventors R.G. Hathorn, S.E. Klein and M.W. Welsh.

U.S. Appl. No. 14/870,554, filed Sep. 30, 2015, by inventors R.G. Hathorn, S.E. Klein and M.W. Welsh.

U.S. Appl. No. 14/870,569, filed Sep. 30, 2015, by inventors R.G. Hathorn, S.E. Klein and M.W. Welsh.

"Fibre Channel Single-Byte Command Code Sets Mapping Protocol-5 (FC-SB-5)", Rev. 2.00, American National Standard for Information Technology, Mar. 26, 2013, pp. 269.

"Fibre Channel Link Service (FC-LS-3)", Rev. 3.10, American National Standard for Information Technology, Feb. 1, 2014, pp. 207.

"Fibre Channel Framing and Signaling-4 (FC-FS-4)", Rev. 1.20, American National Standard for Information Technology, Jul. 21, 2015, pp. 463.

"Information Technology—Fibre Channel Protocol for SCSI, Fourth Version (FCP-4)", American National Standard T10 Project 1828-D, Revision 02b, Jan. 3, 2011, pp. 147.

* cited by examiner

CONFIGURATION OF A SET OF QUEUES FOR MULTI-PROTOCOL OPERATIONS IN A TARGET DRIVER

BACKGROUND

1. Field

Embodiments relate to the configuration of a set of queues for multi-protocol operations in a target driver.

2. Background

A storage controller may control access to storage for one or more host computational devices that may be coupled to the storage controller over a network. A storage management application that executes in the storage controller may manage a plurality of storage devices, such as disk drives, tape drives, flash drives, etc., that are coupled to the storage controller. A host may send Input/Output (abbreviated as I/O or JO) commands to the storage controller and the storage controller may execute the I/O commands to read data from the storage devices or write data to the storage devices.

A host bus adapter (HBA) may comprise a circuit board and/or integrated circuit based adapter that may include components such as a Fibre Channel interface chip, where the Fibre Channel interface chip may be referred to as an embedded port. The host bus adapter may provide I/O processing and provide physical connectivity for the storage controller to a storage area network (SAN), where the storage area network includes a Fibre Channel switched fabric. The storage controller (via the host bus adapter) may act as a target that receives I/O commands from the one or more host computational devices, where the one or more host computational devices act as initiators of the I/O commands.

Communication between the hosts and the storage controller may occur over a Fibre Channel (FC) network, where Fibre Channel refers to an integrated set of architectural standards for data transfer being developed by the American National Standards Institute. Fibre Channel is a high-speed network technology primarily used for storage area networks. Fibre Channel Protocol (FCP) is a transport protocol that predominantly supports transports commands over Fibre Channel networks.

Fibre Channel may be split into five layers: a Protocol-mapping layer (FC-4), a common service layer (FC-3), a network layer (FC-2), a data link layer (FC-1), and a FC-0 layer that defines the physical link in the system, including the fibre, connectors, optical and electrical parameters for a variety of data rates. Layers FC-0 through FC-2 are also known as FC-PH, the physical layers of Fibre Channel, whereas FC-3 and FC-4 layers define how Fibre Channel ports interact with applications in computational devices. The FC-3 layer of the FC standard is intended to provide the common services for features such as striping, multicasting, etc.

FC-4, the highest layer in Fibre Channel, defines the application interfaces that execute over Fibre Channel. FC-4 specifies the mapping rules of upper layer protocols using the FC layers below. FC-4 is formed by a series of profiles that define how to map legacy protocols to Fibre Channel. Fibre Channel is capable of transporting both network and channel information, and profiles for network and channel protocols, such as, Small Computer System Interface (SCSI), Intelligent Peripheral Interface (IPI), High Performance Parallel Interface (HIPPI) Framing Protocol, Internet Protocol (IP), Link Encapsulation (FC-LE), Single-Byte Command Code Set Mapping (SBCCS), etc., may be specified or proposed as protocol mappings in FC-4.

Fibre Connection (FICON) is a protocol of the fibre channel architecture and may also be referred to by the formal name of FC-SB-5. FICON is a protocol layer that builds upon the Fibre Channel transport protocol. Further details of Fibre Channel protocol mapping for the Single-Byte Command Code Sets may be found in the publication, "Fibre Channel Single-Byte Command Code Sets Mapping Protocol-5 (FC-SB-5)", Rev. 2.0, published by the American National Standards Institute on Mar. 26, 2013.

The basic building blocks of a Fibre Channel connection are called "Frames". The frames contain the information to be transmitted (Payload), the address of the source (i.e., initiator) and destination (i.e., target) ports and link control information. Frames are broadly categorized as data frames and link control frames. Details of framing and signaling aspects of Fibre Channel may be found in the publication, "Fibre Channel Framing and Signaling-4 (FC-FS-4)", Rev. 1.20, published by the American National Standard for Information Technology on Jul. 21, 2015. Details of link services aspects of Fibre Channel may be found in the publication, "Fibre Channel Link Services (FC-LS-3)", Rev. 3.10, published by the American National Standard for Information Technology on Feb. 1, 2014. The Fibre Channel Protocol for SCSI Fourth Version (FCP-4) standard describes the frame format and protocol definitions required to transfer commands and data between a SCSI (Small Computer System Interface) initiator and target using the Fibre Channel family of standards. Further details of FCP-4 may be found in the publication, "Information Technology—Fiber Channel Protocol for SCSI, Fourth Version (FCP-4), Revision 02b" published by the International Committee for Information Technology Standards, on Jan. 3, 2011.

The storage controller may include a plurality of host bus adapters, where each host bus adapter may include a Fibre Channel Interface chip that is an interface to switches that allow communication over a Fibre Channel network between the storage controller and the plurality of hosts.

Fibre Channel storage area networks may use the Fibre Channel protocol (used by the hardware to communicate), the SCSI protocol (used by software applications to communicate to disks), and other protocols for communication. In Fibre channel, network connections are established between node ports (N_Ports) that are there in computers, servers, storage controllers, storage devices, printers, etc., and fabric ports (F_Ports) that are there in the Fibre channel switched fabric. A Fibre Channel switched fabric relies on one or more switches to establish direct, point-to-point connections between the source and target devices. Each Fibre Channel interface chip in the host bus adapters of the storage controller comprises a port that allows communication of the storage controller to the hosts over the Fibre Channel switched fabric.

Fibre Channel login takes place after a link is operational and the login may an extended link service protocol. Port login is a type of Fibre Channel login that is also known as PLOGI. Port login is used to establish a session between two N_Ports (devices) and is necessary before any upper level (i.e., upper layer) commands or operations can be performed. During the port login, two N_Ports (devices) swap service parameters and make themselves known to each other.

SUMMARY OF THE PREFERRED EMBODIMENTS

Provided are a method, a system, and a computer program product in which a plurality of queues including a target input queue is configured for multi-protocol operation in a driver. The target input queue is configured to receive all incoming new input/output (I/O) initiation messages, regardless of protocol, wherein messages on the target input queue include messages for first burst data that follows a command to preserve order in processing of messages, in response to allocation of identical exchange identifiers to reused messages.

In certain embodiments, Fibre Connection (FICON) sequences, Fibre Channel Protocol (FCP) sequences, and extended link service requests are received, wherein the messages on the target input queue include event notifications to keep order of link events relative to I/O.

In additional embodiments, a set of at least four buffer queues are provided for providing data buffer allocations to an embedded port for placement of different types of received data including FCP commands, FCP data, FICON IU headers, and FICON data. The buffers queues are configured to receive messages and add buffers to the buffer queues such that no response is provided when no error occurs and a response is provided on the target input queue when an error occurs.

In yet additional embodiments, a selected message is requested on a separate request queue with an indication to send responses to the target input queue.

In further embodiments, the driver is a Fibre Channel driver, and a request and response queue pair is provided for the Fibre Channel driver's requests to an embedded port, wherein the request and response queue pairs are configured to perform: continuation of I/O request and link service requests; initiation of error recovery; and initiation of extended link service requests.

In yet further embodiments, the driver is a Fibre Channel driver, and a set of queue pointers are provided, the queue pointers including: IN pointers that are shadowed in a host adapter memory for polling; OUT pointers that are shadowed in the host adapter memory for polling or for being updated by the Fibre Channel driver when queues are full.

In certain embodiments, the driver is a Fibre Channel driver, and a request and response queue pair is provided, wherein the Fibre Channel driver configures and manages an embedded port via the request and response queue pair by using mailbox commands.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A storage array or array controller in a Fibre Channel SAN may support multiple Fibre Channel upper layer protocols on a Fibre Channel port connected to the SAN. Examples of upper layer protocols include Fibre Channel Protocol (FCP-4), FICON (FC-SB-5) command-mode and FICON transport mode, extended link services (FC-LS-2), etc. In certain applications, a Fibre Channel port running port firmware provides lower layer processing (such as FC0 and FC-2 layers) and a host processor or driver software provides processing of the upper layer protocols. In such a system, a communication mechanism between the two processing systems is desirable such that ordering of dependent operations between the protocols is preserved while maintaining an appropriate level of system performance. For the purposes of this disclosure upper layer is also referred to as upper level, and lower layer is also referred to as a lower level, in the context of the protocols.

Certain embodiments provide a communication system between two cooperating processors in a Fibre Channel target application that provides for optimized performance and order among multiple upper level protocols. The mechanism provides a set of interrelated message queues and response queues for receiving and initiation of new work, continuation of operation of open exchanges, and for managing a set of pools of buffers used to contain different types of data related to the operations.

Certain embodiments keep commands and first burst data in order, keep link events and exchange recovery synchronized in order relative to I/O in progress and provide for optimal performance in polling fewer response queues.

Exemplary Embodiments

Figure 1:
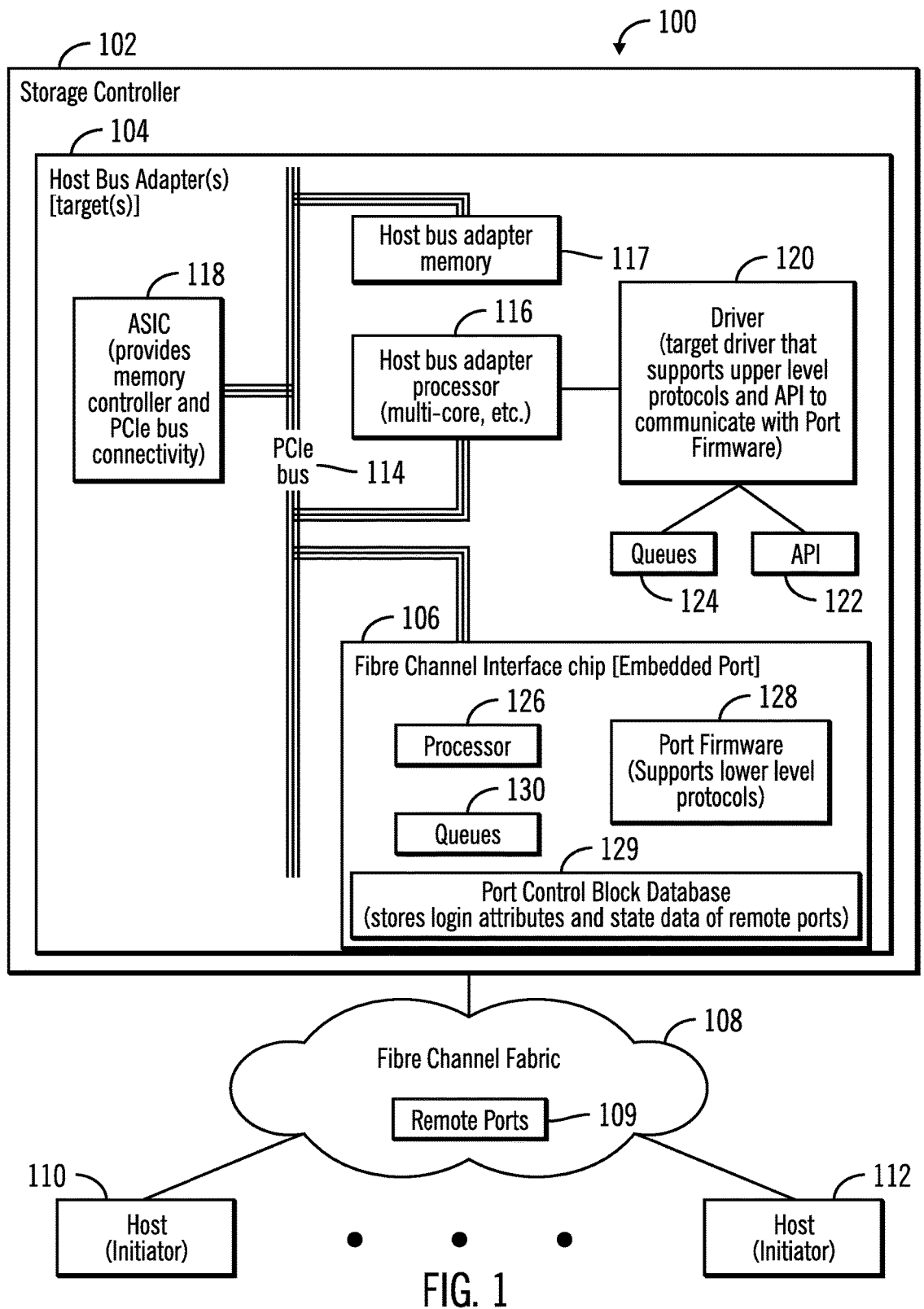
FIG. 1 illustrates a block diagram of a computing environment comprising a storage controller that includes one or more host adapters with one or more Fibre Channel interface chips to couple the storage controller to a Fibre Channel fabric to communicate with a plurality of hosts, in accordance with certain embodiments.

FIG. 1 illustrates a block diagram of a computing environment 100 comprising a storage controller 102 that includes one or more host adapters 104 with one or more Fibre Channel interface chips 106 to couple the storage controller 102 to a Fibre Channel fabric 108, to communicate with a plurality of hosts 110, 112, in accordance with certain embodiments.

The storage controller 102 that includes the host bus adapter 104 may control storage devices (not shown), and receive I/O commands from the hosts 110, 112. The storage controller 102 and the hosts 110, 112 may comprise any suitable computational device including those presently known in the art, such as, a personal computer, a workstation, a server, a mainframe, a hand held computer, a palm top computer, a telephony device, a network appliance, a blade computer, a processing device, etc. In certain embodiments the storage controller 102 may be comprised of one or more storage servers. A plurality of storage servers may provide redundancy because if one storage server undergoes a failure from which recovery is not possible, an alternate storage server may perform the functions of the storage server that failed. The storage controller 102 and the hosts 110, 112 may be elements in any suitable network, such as, a storage area network, a wide area network, the Internet, an intranet. In certain embodiments, the storage controller 102 and the hosts 110, 112 may be elements in a cloud computing environment.

In FIG. 1, the storage controller 102 may include one or more host bus adapters 104 that operate as targets of I/O operations initiated by one or more hosts 110, 112. The host bus adapter 104 does not have control over the arrival of host I/O operations. In certain embodiments, each host bus adapter 104 may be in the form of an adapter card that is plugged into the Peripheral Component Interconnect Express (PCIe) slot of the storage controller 102.

The host bus adapter 104 may include a PCIe bus 114 to which a host bus adapter processor 116, a host bus adapter memory 117, and the Fibre Channel interface chip 106 are coupled. An ASIC 118 may reside in the host bus adapter 104, where the ASIC 118 provides a memory controller and PCIe bus connectivity.

The host bus processor 116 may be a single-core or a multi-core processor. A driver 120 that supports upper level protocols e.g., FCP, FICON, FC-4 layer standards, etc., executes operations on the host bus adapter processor 116. The host bus adapter memory 117 may comprise any suitable memory known in the art such as a Random Access Memory (RAM), a dynamic RAM (DRAM), flash memory, etc. The driver 120 communicates with the Fibre Channel interface chip 106 by using an application programming interface (API) 122. Various data structures, such as queues 124 are maintained by the driver 120. In certain embodiments, the driver 120 may be implemented in software, hardware, firmware or any combination thereof.

The Fibre Channel Interface Chip 106 is also referred to as an embedded port. The embedded port 106 includes a processor 126 and a port firmware 128 that supports lower level protocols like those for framing, signaling, etc. In certain embodiments, functions of the port firmware 128 may be implemented in software, hardware, firmware or any combination thereof. Various data structures, such as queues 130 (e.g., request queues) are maintained by the port firmware 128. The embedded port 106 supports lower level protocols of Fibre Channel and the driver 120 supports upper level protocols. The embedded port 106 that supports lower level protocols of Fibre Channel connects the host bus adapter 104 to the Fibre Channel fabric 108.

The embedded port 106 includes a port control block database 129 that is maintained by the port firmware 128. The port control block database 129 stores login attributes and state data of remote ports 109 (in the Fibre Channel Fabric 108) that may have logged in to the embedded port 106.

The hosts 110, 112 may send I/O commands to the storage controller 102 over the Fibre Channel fabric 108. The embedded port 106 receives the Fibre Channel frames corresponding to the request. The driver 120 which supports upper level protocols of Fibre Channel is in communication with the embedded port 106. The driver 120 uses the embedded port 106 and communicates via the upper level protocols with the hosts 110, 112, and responds to I/O commands via the embedded port 106.

Therefore, FIG. 1 illustrates certain embodiments in which a driver 120 of a host bus adapter 104 in association with the port firmware 128 of an embedded port 106 allows the host bus adapter 104 to process and respond to I/O commands from one or more hosts 110, 112.

Figure 2:
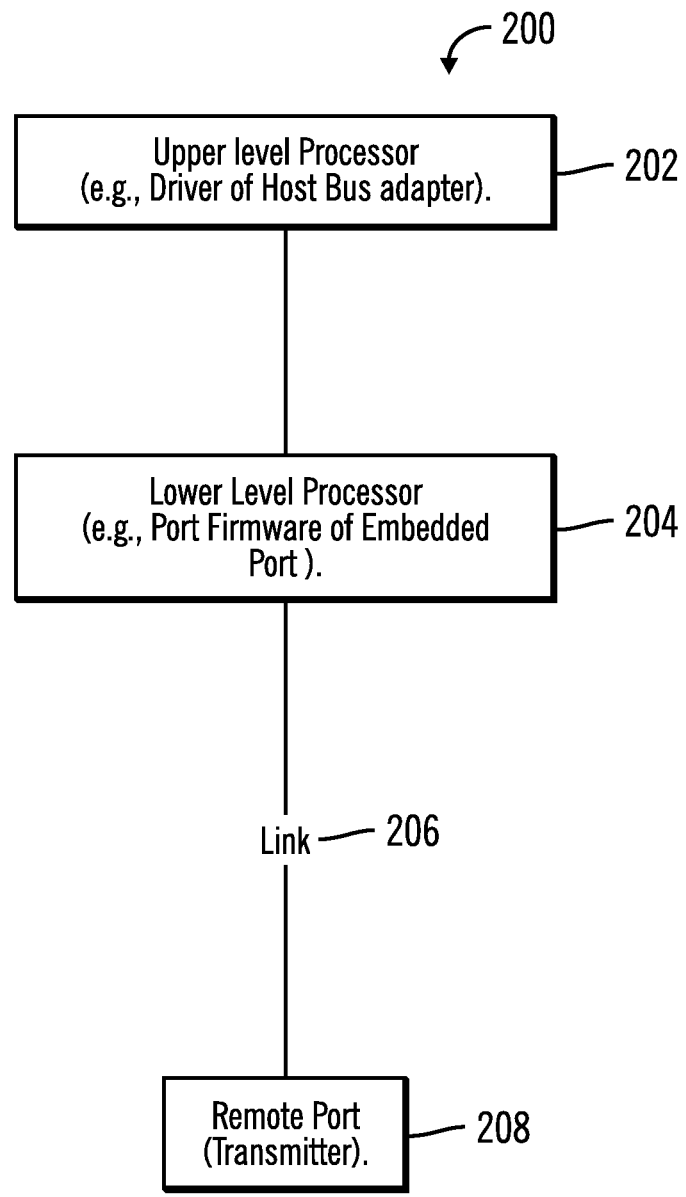
FIG. 2 illustrates a block diagram that shows an upper level processor and a lower level processor that has a link to a remote port, in accordance with certain embodiments.

FIG. 2 illustrates a block diagram 200 that shows an upper level processor 202 and a lower level processor 204 that has a link 206 to a remote port 208, in accordance with certain embodiments. In certain embodiments, the remote port 208 is an F_Port in a Fibre Channel fabric or a directly connected N_Port.

In certain embodiments, the upper level processor 202 may comprise the driver 120 of the host bus adapter 104 that is included in the storage controller 102. The upper level processor 202 may process upper layer protocol stacks of Fibre channel, such as extended link services, fabric services, FCP, FICON, etc.

In certain embodiments, the lower level processor 204 may comprise the port firmware 128 that manages the operations of the embedded port (e.g., Fibre Channel Interface Chip) 106 that is embedded within the host bus adapter 104 of the storage controller 102. In alternative embodiments the port managed by the lower level processor 204 may be a non-embedded port (i.e., a standalone port not included in the host bus adapter 104). The lower level processor 204 may manage the lower layer protocol stacks, such as the framing and signaling layers of Fibre Channel.

The lower level processor 204 manages the link 206 established between the port 106 being managed by the lower level processor 204 and the remote port 208. The remote port 208 may act as a transmitter over the link 206 to the lower level processor 204.

Figure 3:
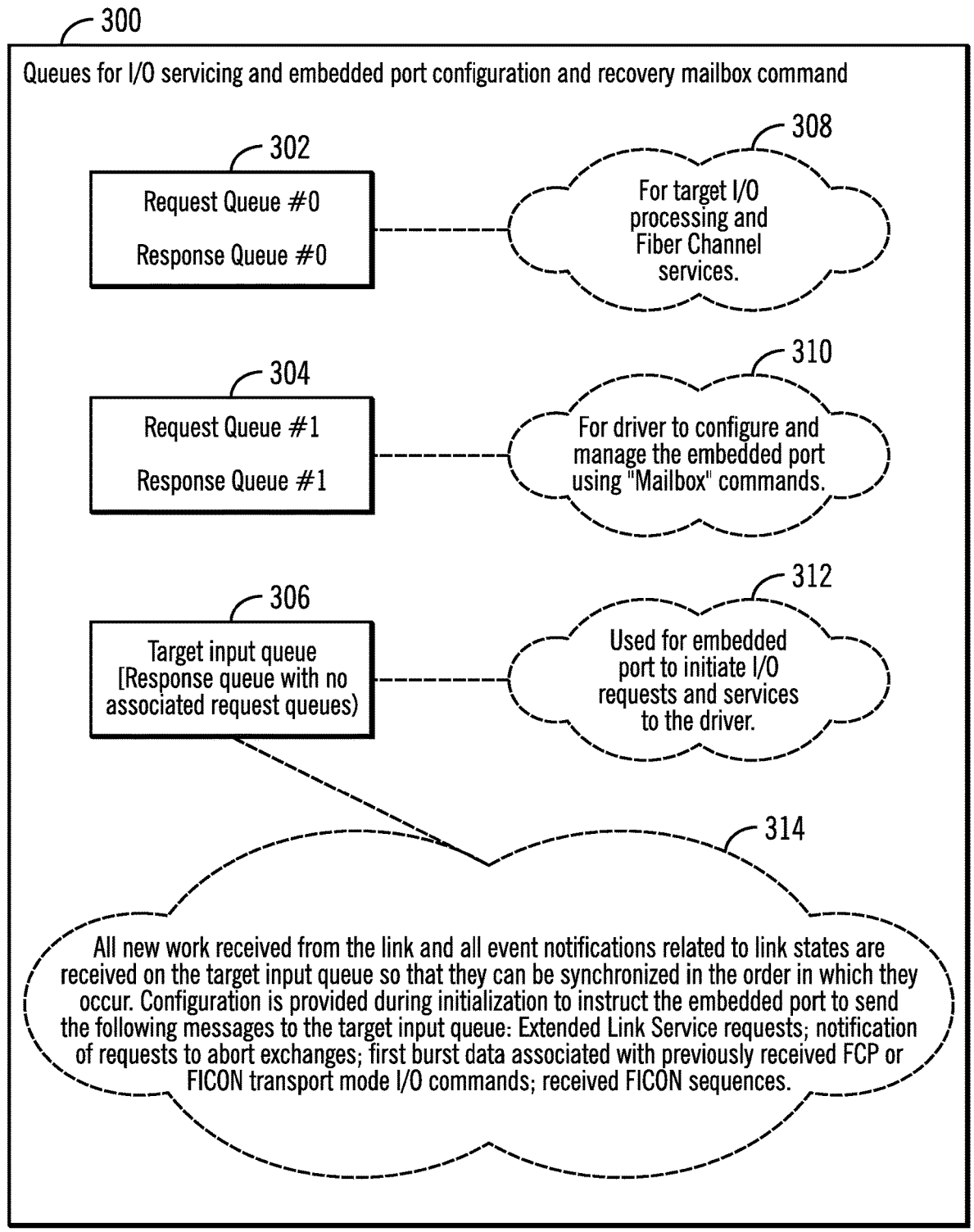
FIG. 3 illustrates a block diagram that shows queues for I/O servicing, embedded port configurations and recovery mailbox commands, in accordance with certain embodiments.

FIG. 3 illustrates a block diagram 300 that shows queues for I/O servicing, embedded port configurations and recovery mailbox commands, in accordance with certain embodiments.

Three Queue Sets 302, 304, 306 are used for I/O servicing, embedded port configuration and recovery mailbox commands. The default I/O queue set 302 may have a Request/Response queue for target I/O processing and Fibre Channel services (shown via reference numeral 308). An additional set of Request/Response queues 304 are used for "Mailbox commands" sent using messages as per Fibre Channel (shown via reference numeral 310). The target input queue 306 is a special type of queue used for the embedded port 106 to initiate I/O requests and services to the driver 120 that is also referred to as the Fibre Channel Driver (as shown via reference numeral 312).

All new work received from the link 206 and all event notifications related to link states are received on the target input queue 306 so that they may be synchronized in the order in which they occur. Configuration is provided during initialization to instruct the embedded port 106 to send the following messages to the target input queue 306: Extended Link Service requests; notification of requests to abort exchanges; first burst data associated with previously received FCP or FICON transport mode I/O commands; and received FICON sequences (as shown via reference numeral 314).

Figure 4:
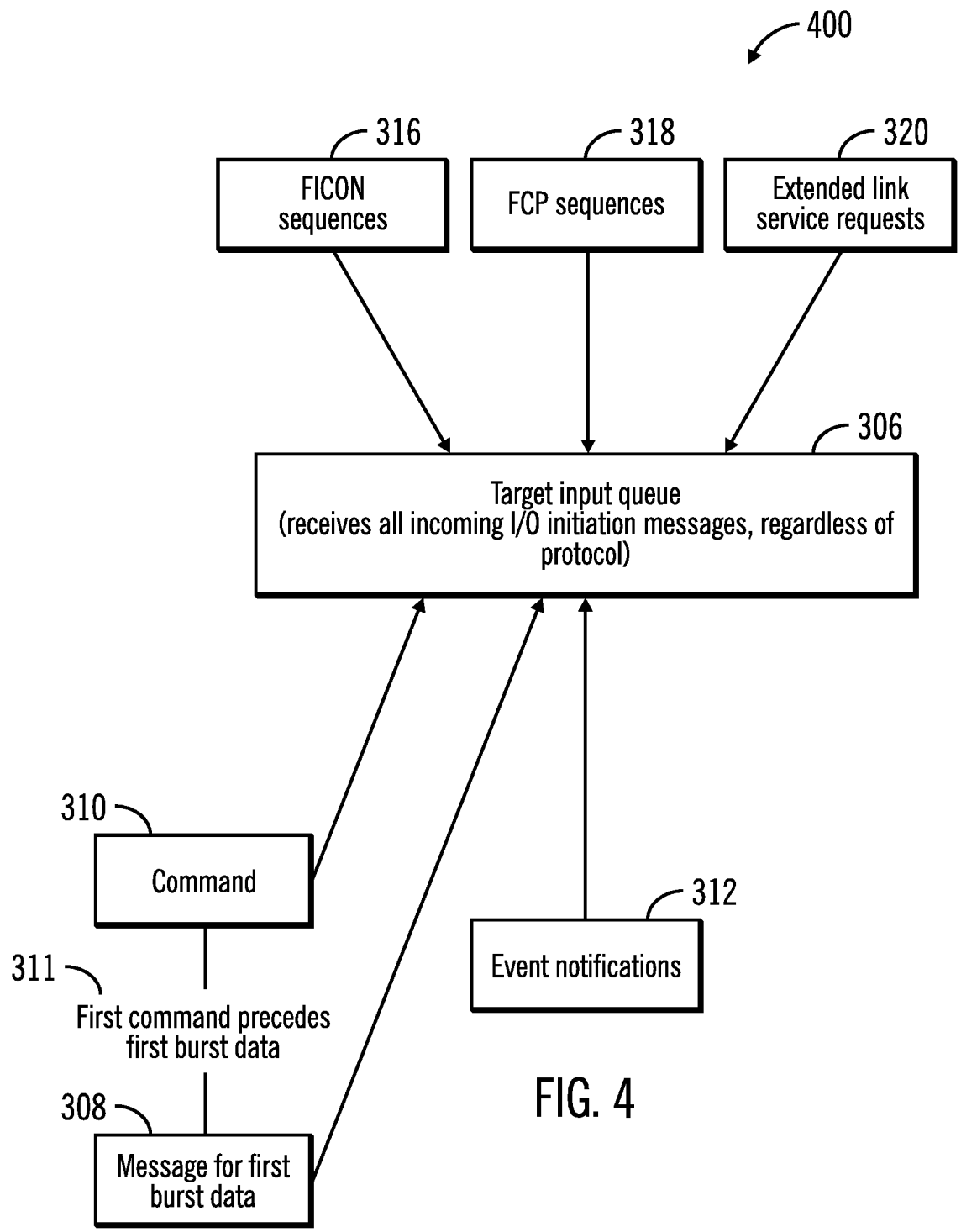
FIG. 4 illustrates a block diagram that shows operations associated with a target input queue, in accordance with certain embodiments.

FIG. 4 illustrates a block diagram 400 that shows operations associated with a target input queue 306, in accordance with certain embodiments.

The target input queue 306 is configured to receive all incoming new I/O initiation messages, regardless of protocol. The messages on the target input queue 306 include messages for first burst data 308 that follows a command 310 such that the first data is not received before the command (as shown via reference numeral 311).

The messages on the target input queue 306 include event notifications 312 to keep the order of link events relative to I/O. The messages on the target input queue 306 also include received FICON sequences 316, FCP sequences 318, and Extended Link service requests 320 as shown. The messages also include a message indicating allocation of an inbound FICON exchange and messages providing a response to a request message to send a FICON sequence, where the message is requested on a separate request queue with an indication to send these responses to the target input queue 306.

Figure 5:
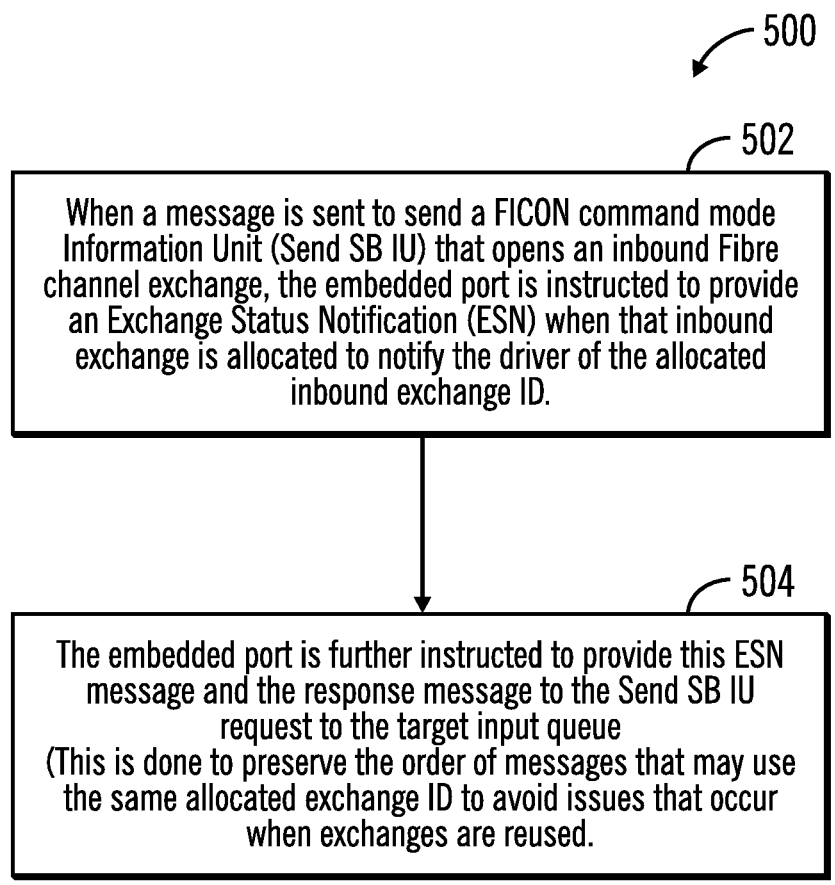
FIG. 5 illustrates a first flowchart that shows operations for preserving the order of processing of messages in Fibre Channel, wherein exchanges are reused and use the same exchange identifier, in accordance with certain embodiments.

FIG. 5 illustrates a first flowchart 500 that shows operations for preserving the order of processing of messages in Fibre Channel, wherein exchanges are reused and use the same exchange identifier, in accordance with certain embodiments.

Control starts at block 502 in which when a message is sent to send a FICON command mode Information Unit (Send SB IU in Fibre Channel terminology) that opens an inbound Fibre channel Exchange, the embedded port 106 is instructed to provide an Exchange Status Notification (ESN) when that inbound exchange is allocated to notify the driver 120 of the allocated inbound exchange identifier (ID). Control proceeds to block 504, in which the embedded port 106 is further instructed to provide this ESN message and the response message to the Send SB IU request to the target input queue 306. This is done to preserve the order of messages that may use the same allocated exchange ID to avoid issues that occur when exchanges are reused. For example, a FICON sequence [or Information Unit (IU)] that opens an inbound exchange may also close that inbound exchange. The request to send this IU is placed on the request queue. The embedded port 106 may place the ESN and response message on the response queue. Since the exchange is now closed, it is available for reuse. The embedded port 106 may use that exchange for another incoming target I/O command and place that command message on the target input queue 306. If the driver 120 sees the new command message on the target input queue 306 before seeing the ESN on the response queue, it will see the exchange allocated for the new command before seeing that it was used for the send SB IU request. When the driver 120 sees the exchange being used for the send SB IU request, that exchange state will be inconsistent. By instructing the embedded port 106 to place the ESN and response messages on the target input queue 306, it is guaranteed to be seen before the reallocation of that exchange in the new command message. Subsequent messages to send FICON sequences that do not change the state of the exchange can have their responses placed on the response queue. By doing so, they do not delay processing of new work from the target input queue 306. Providing all such messages to a single target input queue 306 provides mechanisms for keeping order of I/O operations and their associated data, associated exchanges in the case of FICON exchange pairs, exchange recovery, and link states.

Figure 6:
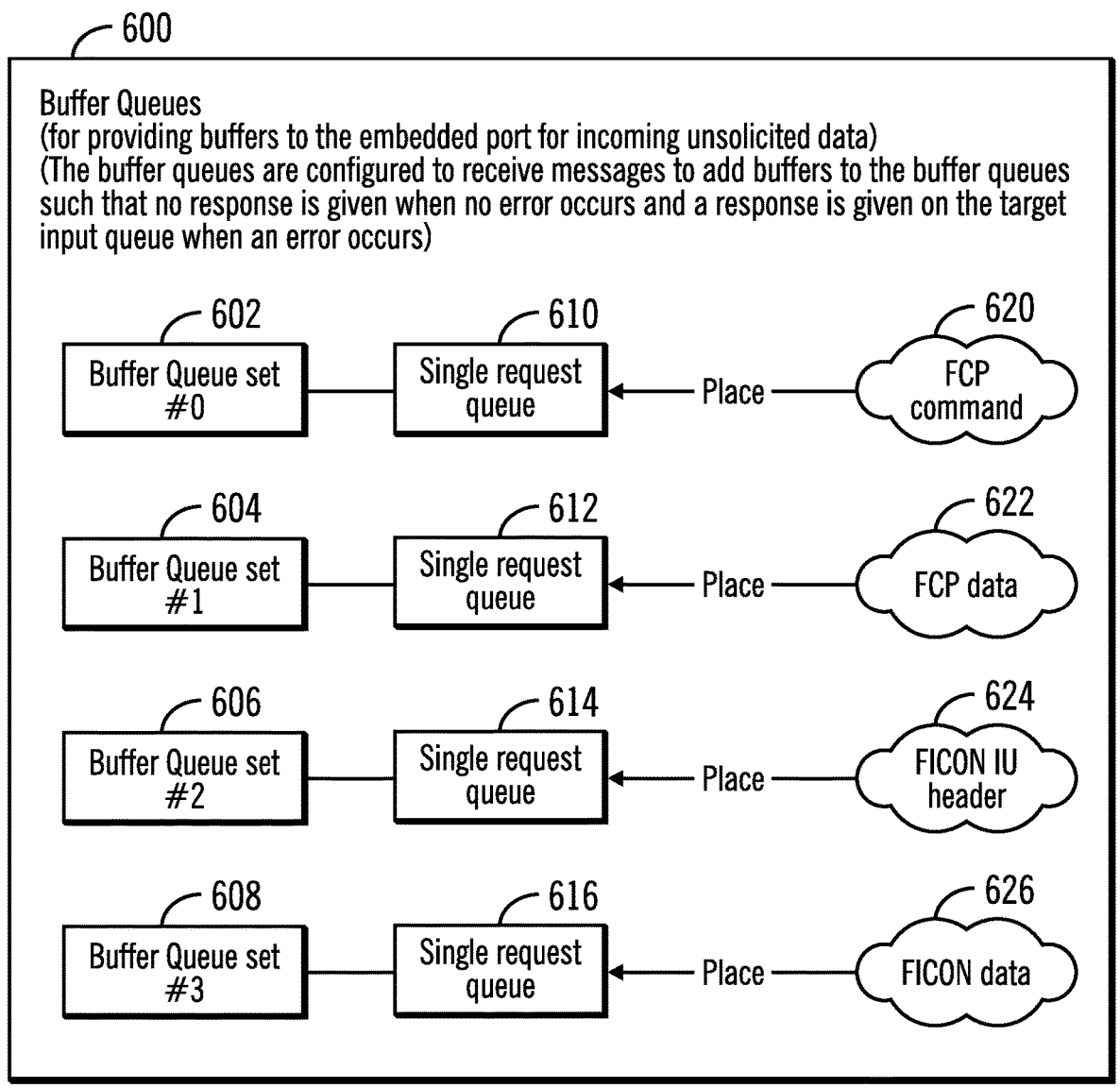
FIG. 6 illustrates a block diagram that shows buffer queue sets, in accordance with certain embodiments.

FIG. 6 illustrates a block diagram 600 that shows buffer queue sets 602, 604, 606, 608, in accordance with certain embodiments.

The four buffer queue sets 602, 604, 606, 608 are for providing buffers to the embedded port 106 for incoming unsolicited data. The buffer queues sets 602, 604, 606, 608 are configured to receive messages to add buffers to the buffer queues such that no response is given when no error occurs and a response is given on the target input queue 306 when an error occurs. FCP commands 620 are placed in the single request queue 610. FCP data 622 is placed in the single request queue 612. FICON Information Unit headers 624 are placed in the single request queue 614, and FICON data is placed in the single request queue 616.

There may be four or a different number of buffer queue sets used for providing buffers to the embedded port 106 for incoming unsolicited data. Each queue set has only a single request queue (as shown via reference numerals 610, 612, 614, 616). All responses may be directed to a single response queue. Normally, there are no responses to the Load Buffer Pool message request that is sent on these queues in Fibre Channel. There is only a response in the case of an error. Directing responses to a single response queue avoids having to poll extra response queues.

Figure 7:
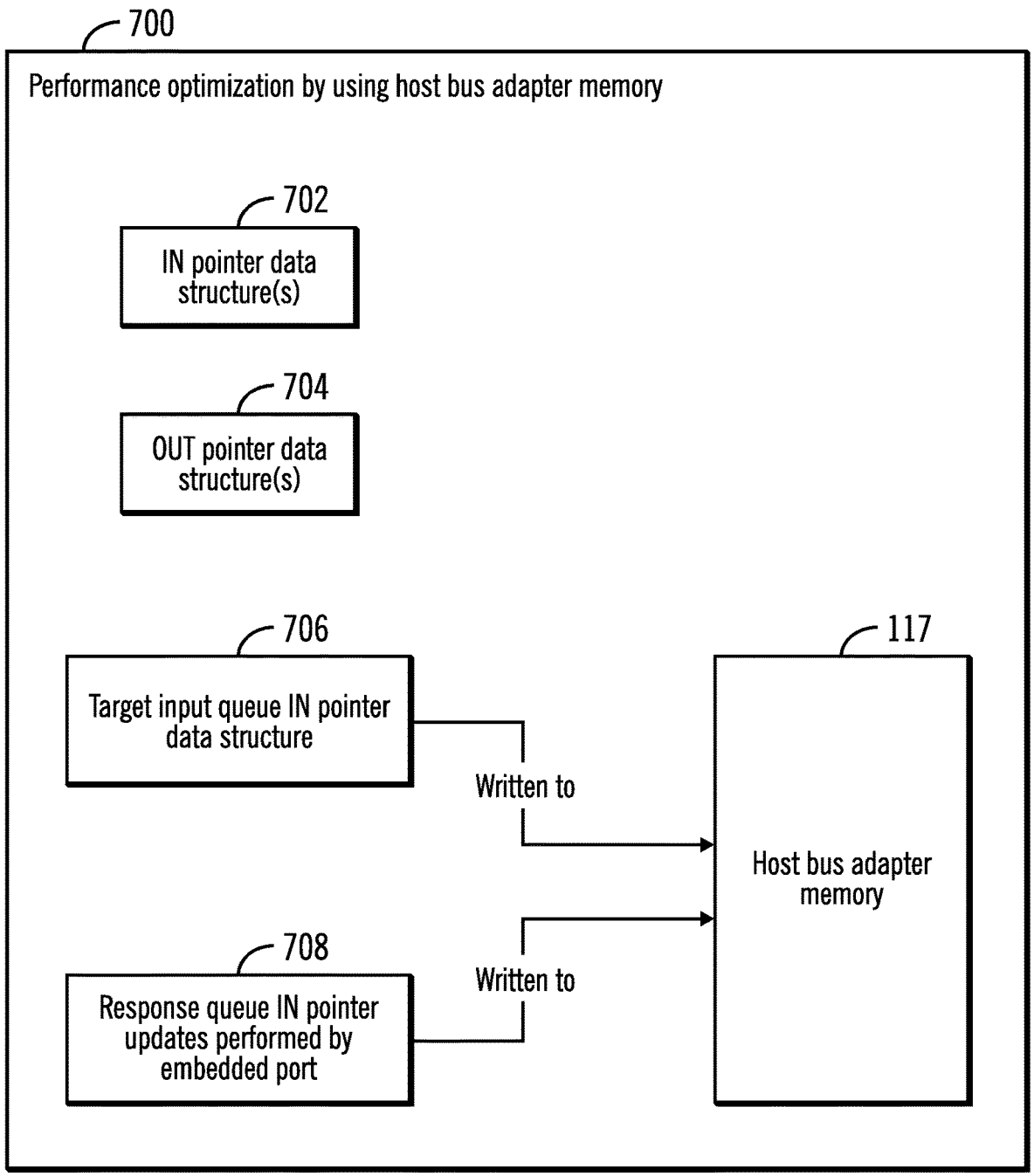
FIG. 7 illustrates a block diagram that shows performance optimization by using the host bus adapter memory, in accordance with certain embodiments.

FIG. 7 illustrates a block diagram that shows performance optimization by using the host bus adapter memory 117, in accordance with certain embodiments.

Queues may operate such that messages are placed at an IN pointer 702 by a sender and then the IN pointer 702 is incremented. Messages are read by the receiver at an OUT pointer 704 and then the OUT pointer 704 is updated. To optimize performance, the target input queue IN pointer 706 and response queue IN pointer updates 708 performed by the embedded port 106 may be written to the host adapter driver memory 117. This avoids having to read registers or port memory over a PCIe bus 114 for polling for new queue entries or implementing a phase bit to be set and polled in the queue entries.

Certain embodiments also provides shadowing of the OUT pointer updates performed by the embedded port 106 when messages are pulled from the request queues. When shadowing of OUT pointer updates is not available, OUT pointers may be read from port registers or memory only when a queue full condition exists.

Figure 8:
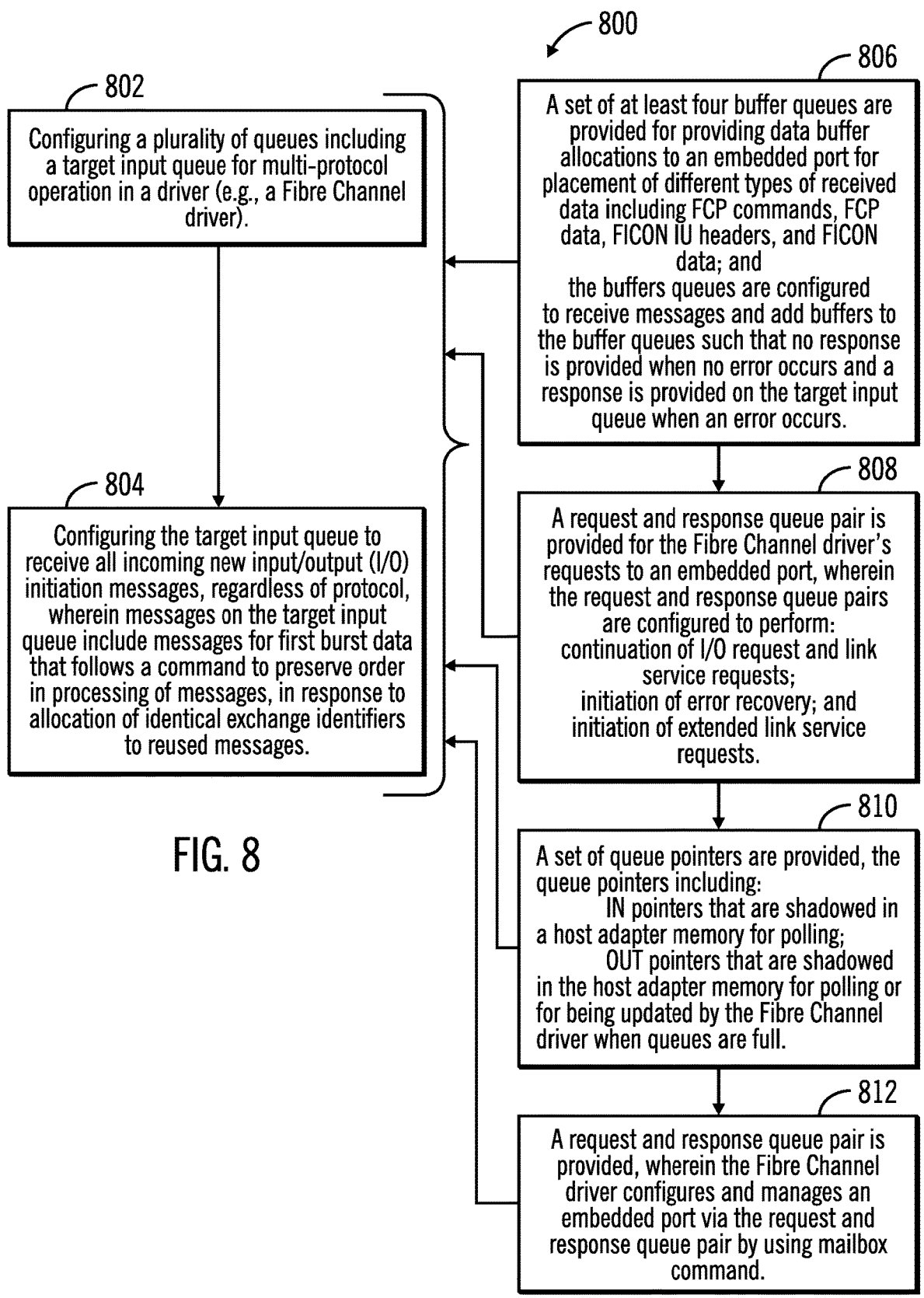
FIG. 8 illustrates a second flowchart that shows operations for preserving the order of processing of messages in Fibre Channel, wherein exchanges are reused and use the same exchange identifier, in accordance with certain embodiments.

FIG. 8 illustrates a second flowchart 800 that shows operations for preserving the order of processing of messages in Fibre Channel, wherein exchanges are reused and use the same exchange identifier, in accordance with certain embodiments. The operations shown in FIG. 8 may at least be performed by the driver 120 that may also be referred to as a Fibre Channel driver.

Control starts at block 802 in which a plurality of queues including a target input queue 306 is configured for multi-protocol operation in a driver (e.g., a Fibre Channel driver 120). The target input queue 306 is configured (at block 804) to receive all incoming new input/output (I/O) initiation messages, regardless of protocol, wherein messages on the target input queue 306 include messages for first burst data that follows a command to preserve order in processing of messages, in response to allocation of identical exchange identifiers to reused messages.

In certain embodiments, Fibre Connection (FICON) sequences, Fibre Channel Protocol (FCP) sequences, and extended link service requests are received, wherein the messages on the target input queue include event notifications to keep order of link events relative to I/O.

In additional embodiments, additional processing operations 806, 808, 810, 812 for performing the operations shown by reference numerals 802, 804 are performed.

In block 806, a set of at least four buffer queues 602, 604, 606, 608 are provided for providing data buffer allocations to an embedded port 106 for placement of different types of received data including FCP commands 620, FCP data 622, FICON IU headers 624, and FICON data 626. The buffers queue sets 602, 604, 606, 608 are configured to receive messages and add buffers to the buffer queue sets 602, 604, 606, 608 such that no response is provided when no error occurs and a response is provided on the target input queue 306 when an error occurs.

In yet additional embodiments, a selected message is requested on a separate request queue with an indication to send responses to the target input queue.

In further embodiments, in block 808, a request and response queue pair is provided for the Fibre Channel driver's requests to an embedded port 106, wherein the request and response queue pairs are configured to perform: continuation of I/O request and link service requests; initiation of error recovery; and initiation of extended link service requests.

In yet further embodiments, in block 810, a set of queue pointers are provided, the queue pointers including: IN pointers 702 that are shadowed in a host adapter memory 117 for polling; OUT pointers 704 that are shadowed in the host adapter memory 117 for polling or for being updated by the Fibre Channel driver 120 when queues are full.

In certain embodiments, in block 812, a request and response queue pair 304 is provided, wherein the Fibre Channel driver 120 configures and manages an embedded port via the request and response queue pair by using mailbox commands.

Therefore FIGS. 1-8 illustrate certain embodiments for management of queues for multi-protocol operations in Fibre Channel driver 120. A communication system is provided between a lower level processor and an upper level processor to provide for optimized performance and order among multiple upper level protocols running over Fibre Channel. The embodiments described in FIGS. 1-8 provide a set of interrelated message queues and response queues (shown at least in FIGS. 3, 4, 6) for receiving and initiation of new work, continuation of operation of open exchanges, and for managing a set of pools of buffers used to contain different types of data related to the operations. Certain embodiments keep commands and first burst data in order, and keep link events and exchange recovery synchronized in order, relative to I/O in progress, and provide for optimal performance in polling fewer response queues.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
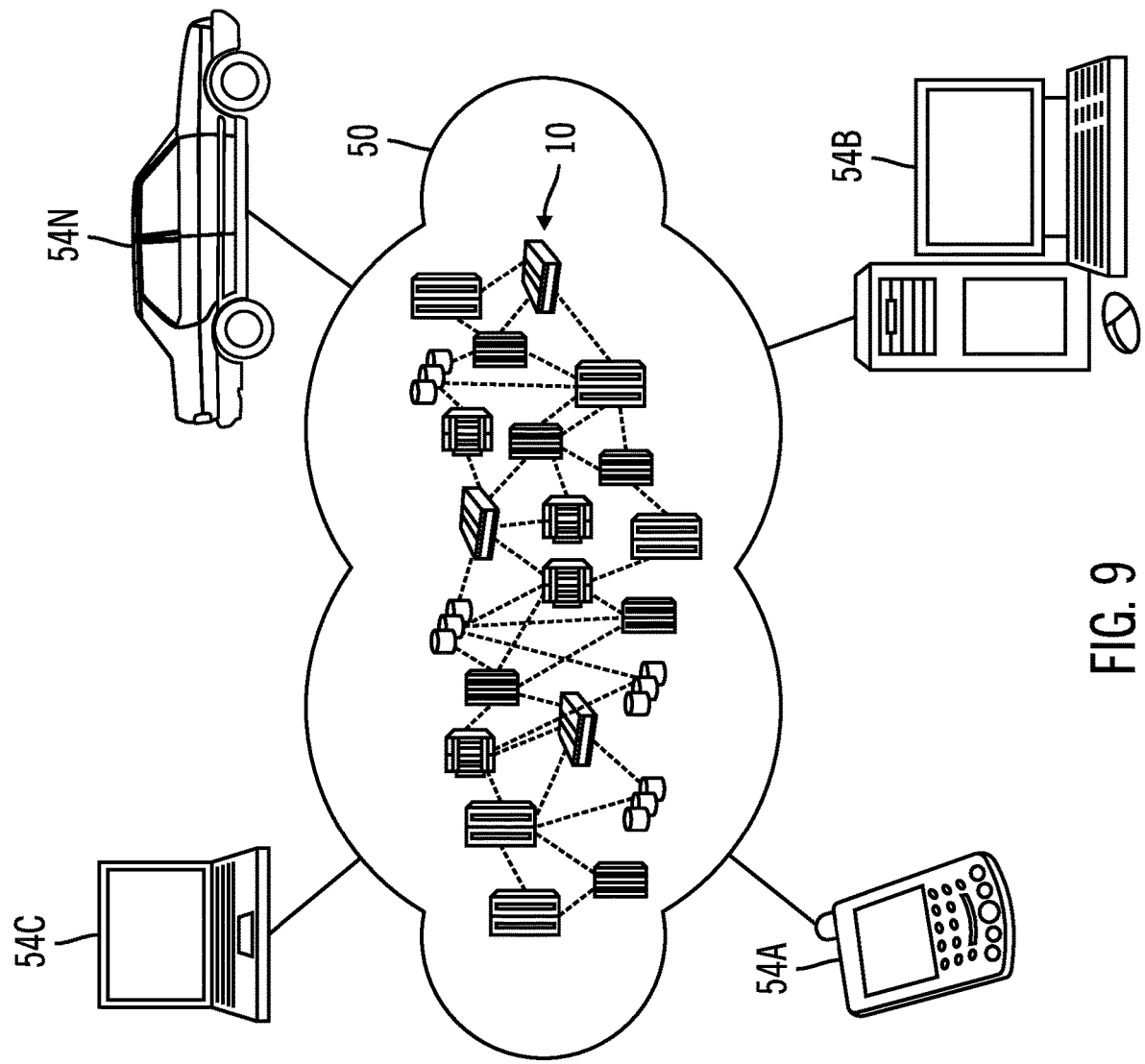
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
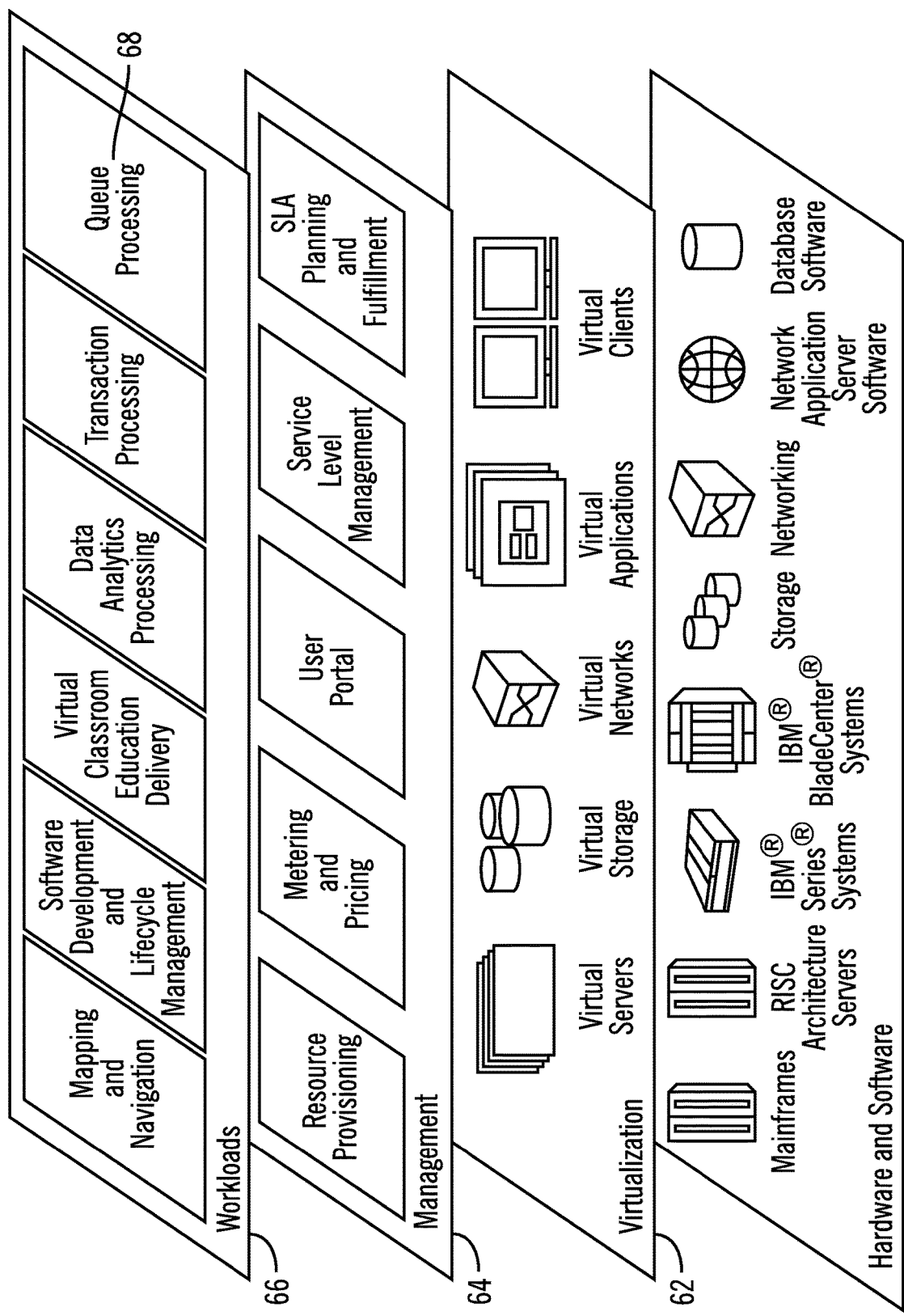
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and queue processing 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
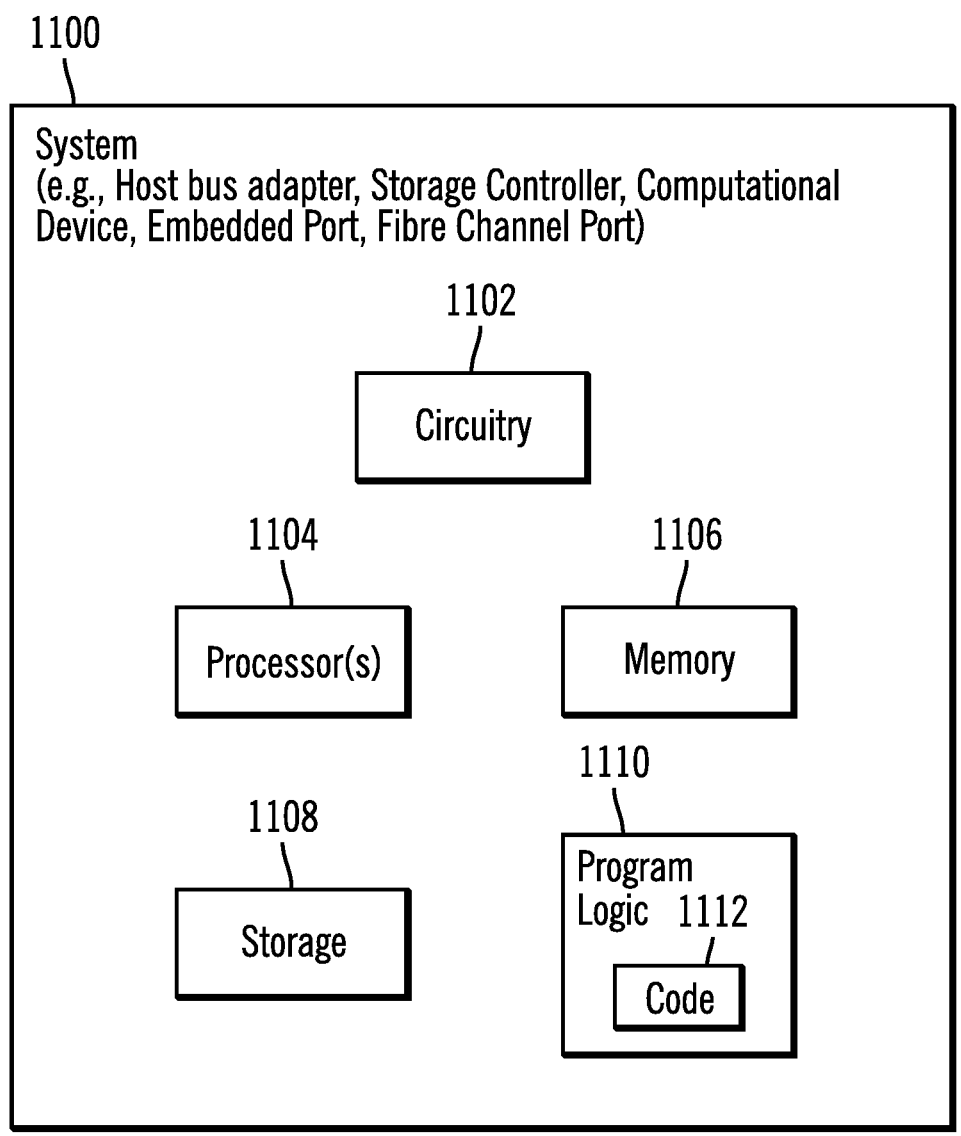
FIG. 11 illustrates a block diagram of a computational system that shows certain elements that may be included in the storage controller, the host bus adapter, the embedded port, and the host shown in FIG. 1, in accordance with certain embodiments.

FIG. 11 illustrates a block diagram that shows certain elements that may be included in the host bus adapter 104, the storage controller 102, the embedded port 106, a Fibre Channel port 106, or other computational devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
configuring a plurality of queues including a target input queue for multi-protocol operation in a driver; and
configuring the target input queue to receive, by the target input queue, all incoming new input/output (I/O) initiation messages, regardless of protocol, wherein messages on the target input queue include messages for first burst data that follows a command to preserve order in processing of messages, in response to allocation of identical exchange identifiers to reused messages by an embedded port, by operations comprising:
receiving, by the embedded port, a request, wherein the request opens an inbound exchange; and
in response to receiving the request by the embedded port, providing by the embedded port to the target input queue, an Exchange Status Notification (ESN) message and a response message to close the inbound exchange, wherein in response to closing of the inbound exchange, the inbound exchange is available for reuse by the embedded port, wherein by placing the ESN message on the target input queue, the ESN message is processed by the driver prior to reallocation of the inbound exchange to another request, and wherein the inbound exchange notifies the driver of an exchange identifier.

2. The method of claim 1, wherein Fibre Connection (FICON) sequences, Fiber Channel Protocol (FCP) sequences, and extended link service requests are received, and wherein the messages on the target input queue include event notifications.

3. The method of claim 1, wherein:
a set of at least four buffer queues are provided for providing data buffer allocations to the embedded port for placement of different types of received data including FCP commands, FCP data, FICON Information Unit (IU) headers, and FICON data.

4. The method of claim 1, wherein a selected message is requested on a separate request queue with an indication to send responses to the target input queue.

5. The method of claim 1, wherein the driver is a Fibre Channel driver, wherein a request and response queue pair is provided for the Fibre Channel driver's requests to the embedded port, and wherein the request and response queue pairs are configured to perform:
continuation of I/O request and link service requests;
initiation of error recovery; and
initiation of extended link service requests.

6. The method of claim 1, wherein the driver is a Fibre Channel driver, and wherein a set of queue pointers are provided, the queue pointers including:
IN pointers that are shadowed in a host adapter memory for polling; and
OUT pointers that are shadowed in the host adapter memory for polling or for being updated by the Fibre Channel driver when queues are full.

7. The method of claim 1, wherein the driver is a Fibre Channel driver, wherein a request and response queue pair is provided, and wherein the Fibre Channel driver configures and manages the embedded port via the request and response queue pair by using mailbox commands.

8. A system, comprising:
a memory; and
a processor coupled to the memory, wherein the processor performs operations, the operations comprising:
configuring a plurality of queues including a target input queue for multi-protocol operation in a driver; and
configuring the target input queue to receive, by the target input queue, all incoming new input/output (I/O) initiation messages, regardless of protocol, wherein messages on the target input queue include messages for first burst data that follows a command to preserve order in processing of messages, in response to allocation of identical exchange identifiers to reused messages by an embedded port, by operations comprising:
receiving, by the embedded port, a request, wherein the request opens an inbound exchange; and
in response to receiving the request by the embedded port, providing by the embedded port to the target input queue, an Exchange Status Notification (ESN) message and a response message to close the inbound exchange, wherein in response to closing of the inbound exchange, the inbound exchange is available for reuse by the embedded port, wherein by placing the ESN message on the target input queue, the ESN message is processed by the driver prior to reallocation of the inbound exchange to another request, and wherein the inbound exchange notifies the driver of an exchange identifier.

9. The system of claim 8, wherein FICON sequences, FCP sequences, and extended link service requests are received, and wherein the messages on the target input queue include event notifications.

10. The system of claim 8, wherein:
a set of at least four buffer queues are provided for providing data buffer allocations to the embedded port for placement of different types of received data including FCP commands, FCP data, FICON IU headers, and FICON data.

11. The system of claim 8, wherein a selected message is requested on a separate request queue with an indication to send responses to the target input queue.

12. The system of claim 8, wherein the driver is a Fibre Channel driver, wherein a request and response queue pair is provided for the Fibre Channel driver's requests to the embedded port, and wherein the request and response queue pairs are configured to perform:
continuation of I/O request and link service requests;
initiation of error recovery; and
initiation of extended link service requests.

13. The system of claim 8, wherein the driver is a Fibre Channel driver, wherein a set of queue pointers are provided, the queue pointers including:
IN pointers that are shadowed in a host adapter memory for polling; and
OUT pointers that are shadowed in the host adapter memory for polling or for being updated by the Fibre Channel driver when queues are full.

14. The system of claim 8, wherein the driver is a Fibre Channel driver, wherein a request and response queue pair is provided, and wherein the Fibre Channel driver configures and manages the embedded port via the request and response queue pair by using mailbox commands.

15. A computer program product, the computer program product comprising a computer readable storage medium having computer readable program code embodied therewith, the computer readable program code configured to perform operations, the operations comprising:
configuring a plurality of queues including a target input queue for multi-protocol operation in a driver; and
configuring the target input queue to receive, by the target input queue, all incoming new input/output (I/O) initiation messages, regardless of protocol, wherein messages on the target input queue include messages for first burst data that follows a command to preserve order in processing of messages, in response to allocation of identical exchange identifiers to reused messages by an embedded port, by operations comprising:
receiving, by the embedded port, a request, wherein the request opens an inbound exchange; and
in response to receiving the request by the embedded port, providing by the embedded port to the target input queue, an Exchange Status Notification (ESN) message and a response message to close the inbound exchange, wherein in response to closing of the inbound exchange, the inbound exchange is available for reuse by the embedded port, wherein by placing the ESN message on the target input queue, the ESN message is processed by the driver prior to reallocation of the inbound exchange to another request, and wherein the inbound exchange notifies the driver of an exchange identifier.

16. The computer program product of claim 15, wherein FICON sequences, FCP sequences, and extended link service requests are received, and wherein the messages on the target input queue include event notifications.

17. The computer program product of claim 15, wherein:
a set of at least four buffer queues are provided for providing data buffer allocations to the embedded port for placement of different types of received data including FCP commands, FCP data, FICON IU headers, and FICON data.

18. The computer program product of claim 15, wherein a selected message is requested on a separate request queue with an indication to send responses to the target input queue.

19. The computer program product of claim 15, wherein the driver is a Fibre Channel driver, wherein a request and response queue pair is provided for the Fibre Channel driver's requests to the embedded port, and wherein the request and response queue pairs are configured to perform:
continuation of I/O request and link service requests;
initiation of error recovery; and
initiation of extended link service requests.

20. The computer program product of claim 15, wherein the driver is a Fibre Channel driver, wherein a set of queue pointers are provided, the queue pointers including:
IN pointers that are shadowed in a host adapter memory for polling; and
OUT pointers that are shadowed in the host adapter memory for polling or for being updated by the Fibre Channel driver when queues are full, wherein a request and response queue pair is provided, and wherein the Fibre Channel driver configures and manages the embedded port via the request and response queue pair by using mailbox commands.

* * * * *